United States Patent
Lee et al.

(10) Patent No.: US 12,400,548 B1
(45) Date of Patent: Aug. 26, 2025

(54) OTHER-SHIP TRACKING MONITORING SYSTEM AND OTHER-SHIP TRACKING MONITORING METHOD

(71) Applicant: AVIKUS CO., LTD., Seoul (KR)

(72) Inventors: Ho Jin Lee, Seoul (KR); Daeyong Han, Seoul (KR); Hyeondeok Han, Seoul (KR)

(73) Assignee: AVIKUS CO., LTD., Seoul (KR)

( * ) Notice: Subject to any disclaimer, the term of this patent is extended or adjusted under 35 U.S.C. 154(b) by 0 days.

(21) Appl. No.: 19/076,966

(22) Filed: Mar. 11, 2025

Related U.S. Application Data

(63) Continuation of application No. PCT/KR2025/000581, filed on Jan. 10, 2025.

(30) Foreign Application Priority Data

Mar. 29, 2024 (KR) .................. 10-2024-0043431

(51) Int. Cl.
*G06V 20/58* (2022.01)
*G08G 3/02* (2006.01)

(52) U.S. Cl.
CPC .............. *G08G 3/02* (2013.01); *G06V 20/58* (2022.01)

(58) Field of Classification Search
CPC ........ G06V 20/58; G06V 20/56; G06V 40/19; G06V 10/24; G06V 10/82; G06V 40/166; G06V 10/25; G06V 20/00; G06V 10/10; G06V 20/52; G06V 2201/07; G06V 10/764; G06V 10/20; G06V 10/267; G06V 10/426; G06V 10/247; G06V 10/507; G06V 10/70; G06V 10/757; G06V 20/10; G06V 20/38; G06V 40/161; G06V 40/197; G06V 10/245; G06V 2201/12; G06V 10/147; G06V 40/1335; G06V 40/20; G06V 20/40; G06V 10/255; G06V 10/774; G06V 2201/08; G06V 10/80; G06V 40/172; G08G 3/02; G08G 1/16; G08G 5/54; G08G 5/21; G08G 1/0965; G08G 1/167; G08G 1/168;
(Continued)

(56) References Cited

U.S. PATENT DOCUMENTS 11,912,436 B1 * 2/2024 Zhao .................. B64F 1/222
2008/0054158 A1 * 3/2008 Ariyur .................. G01S 3/7864
250/203.1
(Continued)

FOREIGN PATENT DOCUMENTS

KR 10-2003-0045868 A 6/2003
KR 10-2005-0015662 A 2/2005
(Continued)

OTHER PUBLICATIONS

International Search report dated Apr. 11, 2025.

*Primary Examiner* — Nimesh Patel
(74) *Attorney, Agent, or Firm* — Harvest IP Law, LLP

(57) ABSTRACT

The present disclosure relates to other-ship tracking monitoring for tracking and monitoring other ships around a ship, and includes a sensor information collection unit, a selection information collection unit, a tracking camera unit configured to track a selected other ship and collect an enlarged image, and a control unit, wherein the control unit controls the tracking camera unit by considering a size and a position of the selected other ship appearing in the image information.

9 Claims, 7 Drawing Sheets

(58) Field of Classification Search
CPC .......... G08G 1/166; G08G 1/04; G08G 1/054;
G08G 1/01; G08G 1/0175; G08G 1/142;
G08G 5/32; G06T 2210/21; G06T 3/40;
G06T 5/80; G06T 7/80; G06T 19/006;
G06T 2200/24; G06T 2219/2016; G06T
19/20; G06T 2219/2004; G06T 7/70;
G06T 2207/20221; G06T 5/50; G06T
1/00; G06T 15/205; G06T 2200/32; G06T
2207/10028; G06T 3/4038; G06T
2207/30252; G06T 2219/012; G06T 7/11;
G06T 7/50; G06T 7/74; G06T
2207/10016; G06T 7/292; G06T
2207/10024; G06T 2207/20084; G06T
13/40; G06T 13/80; G06T 15/10; G06T
2207/10004; G06T 2207/10036; G06T
2207/30232; G06T 7/20; G06T 7/30;
G06T 7/60; G06T 2207/10021; G06T
2207/10041; G06T 2207/30241; G06T
7/246; G06T 17/00; G06T 7/251; G06T
2207/30181; G06T 2207/30212; G06T
7/254; G06T 7/73; G06T 7/62; G06T
2207/20081; G06T 2207/20132; G06T
2207/30244; G06T 2207/10048; G06T
2207/10044; G06T 2207/10032; G06T
2207/20104; G06T 2207/30236; G06T
7/215; G06T 7/269; G06T 7/55; G06T
7/75; G01C 21/203; G01C 21/20; G01C
13/006; G01C 13/004; G01C 11/025;
G01C 13/00; G01C 13/002; G01C
23/005; G01C 11/02; G01C 11/36; G01C
21/005; G01C 21/3407; B63B 49/00;
B63B 79/10; B63B 79/15; B63B 35/00;
B63B 79/20; B63B 2035/008; B63B
2213/02; B63B 79/40; B63B 2211/02;
B63B 2035/006; B63B 35/50; B63B
22/16; B63B 43/00; B63B 43/18; G03B
19/22; G03B 15/00; G03B 5/00; G03B
2217/005; G03B 13/36; G03B 2205/0046;
G03B 5/02; G03B 13/32; G03B 29/00;
G03B 3/00; G03B 11/00; G03B 35/08;
G03B 35/02; G03B 17/20; G06N 3/08;
G06N 3/045; G06N 3/02; G06N 3/042;
G06N 3/082; G06N 5/04; B25J 13/006;
B25J 19/023; B25J 19/02; B25J 19/06;
B25J 5/00; B60R 2021/0027; B60R 1/27;
B60R 1/28; B60R 16/037; B60R
2001/1253; B60R 2001/1223; B60R
2300/102; B60R 2300/105; B60R
2300/607; B60R 25/1004; G01S 17/89;
G01S 13/04; G01S 15/04; G01S 15/06;
G01S 15/87; G01S 17/66; G01S 7/417;
G01S 17/88; G01S 17/04; G01S 7/4817;
G01S 7/4815; G01S 13/56; G01S 13/886;
G01S 13/931; G01S 15/42; G01S 13/66;
G01S 13/72; G01S 13/867; G01S 3/7865;
G01S 17/86; G01S 13/89; G01S 13/937;
G01S 17/08; G01S 17/42; G01S 19/42;
G01S 3/782; G01S 19/485; G01S 7/42;
G01S 7/4808; B60W 2420/403; B60W
60/00; B60W 2420/408; B60W 60/001;
B60W 30/095; B60W 2050/0018; G05D
1/0206; G05D 1/021; G05D 1/02; G05D
1/12; G02B 7/102; G02B 7/09; G02B
13/02; G02B 13/009; G02B 7/282; G02B
27/646; G02B 13/00; G02B 13/0045;
G02B 7/04; G02B 7/08; G02B 9/00;
G02B 21/22; G02B 21/025; G08B
13/19608; G08B 13/19602; G08B
13/19643; G08B 13/1963; G08B
13/19689; G08B 13/19628; G08B
13/19652; G08B 13/19604; G08B
13/19613; G08B 13/19645; G08B 15/00;
B64U 20/87; B64U 2101/30
See application file for complete search history.

(56) References Cited

U.S. PATENT DOCUMENTS

| | | | |
|---|---|---|---|
| 2013/0155290 A1* | 6/2013 | Huang | G06T 7/74 348/240.1 |
| 2020/0090414 A1* | 3/2020 | Nishiyama | G01C 21/20 |
| 2023/0081665 A1* | 3/2023 | Izumikawa | B63B 49/00 701/21 |

FOREIGN PATENT DOCUMENTS

| | | |
|---|---|---|
| KR | 10-1545276 B1 | 8/2015 |
| KR | 10-2016-0115130 A | 10/2016 |
| KR | 10-2016-0141946 A | 12/2016 |
| KR | 10-2018-0065411 A | 6/2018 |
| KR | 10-2021-0055904 A | 5/2021 |
| KR | 10-2269385 B1 | 6/2021 |
| KR | 10-2344606 B1 | 12/2021 |
| KR | 10-2022-0078378 A | 6/2022 |
| KR | 10-2406600 B1 | 6/2022 |

* cited by examiner

OTHER-SHIP TRACKING MONITORING SYSTEM AND OTHER-SHIP TRACKING MONITORING METHOD

CROSS REFERENCE TO RELATED APPLICATIONS

This application is a By-pass Continuation Application based on an International Application No. PCT/KR2025/000581 filed on Jan. 10, 2025, claiming priority based on Korean Patent Application No. 10-2024-0043431 filed on Mar. 29, 2024, the disclosures of which are incorporated herein by reference in their entireties.

TECHNICAL FIELD

The present disclosure relates to an other-ship tracking monitoring system and an other-ship tracking monitoring method, which are applied to a ship to monitor the surroundings of the ship.

BACKGROUND ART

According to the Convention on the International Regulations for Preventing Collisions at Sea (COLREGs), which is an international law for preventing ship collisions at sea, all ships must always maintain a watch duty by using all appropriate means to understand the surrounding situation and sufficiently assess the risk of collision. All appropriate means refer to all available means, including the sight and hearing of the crew, or the use of radar.

Due to such a watch duty of the crew, as the voyage becomes longer, the fatigue of the crew increases, and the concentration may decrease. Furthermore, even when there are objects at sea that are difficult to identify with the naked eye and pose a potential risk that needs to be identified in advance, failure to recognize them in advance may lead to a voyage accident that causes significant damage.

The related art in this field includes an omnidirectional monitoring system for ships using a pan-tilt-zoom (PTZ) camera and an omnidirectional monitoring method for ships using the same, as described in Korean Patent Registration No. 10-1545276.

DISCLOSURE

Technical Problem

The present disclosure is to provide overall monitoring of the surroundings of a ship, as well as enlarged and tracking monitoring images of a specific object, by using a wide-angle camera and a narrow-angle zoom camera.

Furthermore, the present disclosure is to automatically control a tracking camera that provides an enlarged image of another ship requiring observation.

The objectives of the present disclosure are not limited the foregoing, and other objectives not mentioned above will be clearly understood by those of skill in the art from the following description.

Technical Solution

In order to achieve the above-described objectives, the present disclosure provides an other-ship tracking monitoring system as follows.

An other-ship tracking monitoring system according to an embodiment of the present disclosure includes a sensor information collection unit configured to collect a wide-angle image or radar information about the sea area a ship, a selection information collection unit configured to receive selection information about another ship that is selected based on the wide-angle image or the radar information, a tracking camera unit configured to track the selected other ship and collect an enlarged image, and a control unit including a tracking camera control value generation module configured to generate a control value for controlling the tracking camera unit, wherein the tracking camera control value generation module generates a control value for controlling the tracking camera unit by considering a size and a position of the selected other ship shown in the wide-angle image or the radar information.

An other-ship tracking monitoring method according to an embodiment of the present disclosure includes a sensor information collection operation of collecting a wide-angle image or radar information about a sea area around a ship, a selection information collection operation of receiving selection information about another ship that is selected based on the wide-angle image or the radar information, a tracking camera control value generation operation of generating a control value for controlling a tracking camera by considering a size and a position of the selected other ship shown in the image information, and an enlarged-image collection operation of collecting an enlarged image of the selected other ship from the tracking camera based on the control value.

Advantageous Effects

According to an embodiment of the present disclosure, by using a wide-angle camera and an enlarged-image collection camera, it is possible to perform not only overall monitoring of the surroundings of a ship but also tracking monitoring of an object to be tracked.

According to an embodiment of the present disclosure, control of a tracking camera for an object to be tracked may be automatically performed.

According to an embodiment of the present disclosure, when another ship is selected by a crew member, and even when another ship is newly detected or when information about a tracked other ship is changed, an enlarged image of the other ship may be automatically provided, and thus, a crew member who has a watch duty may easily identify an object on a sea area that is difficult to identify with the naked eye. Accordingly, the fatigue and concentration of the crew may be improved, and a navigation accident may be prevented.

According to an embodiment of the present disclosure, by simultaneously displaying a wide-angle image, an enlarged image, own-ship information, and other-ship information about another ship selected as an observation target, a user may immediately and intuitively check necessary information and solve the problem that it is difficult to find another ship at once when using binoculars and to track and observe according to movements of the other ship and the own ship.

DETAILED DESCRIPTION

Figure 1:
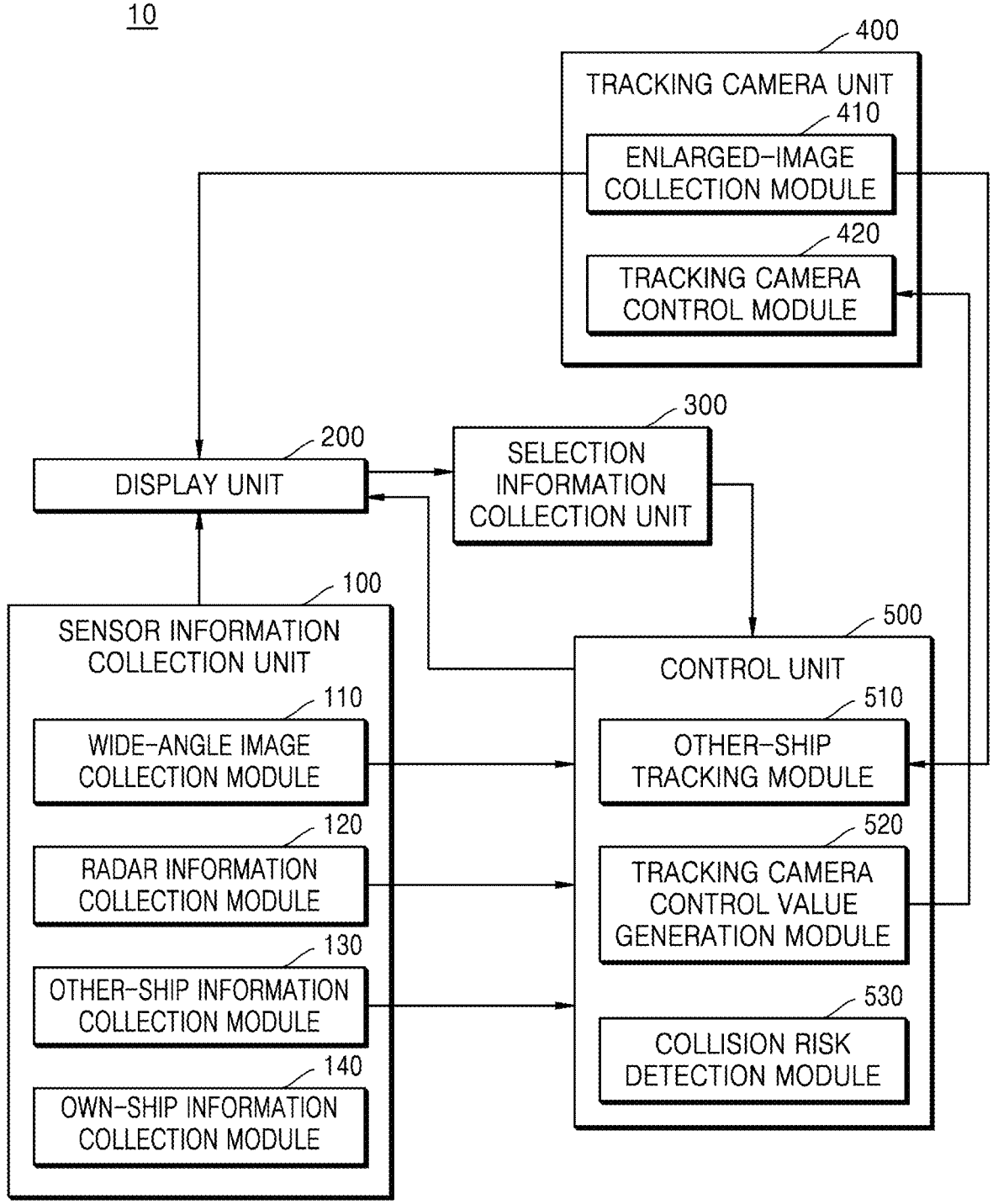
FIG. 1 is a diagram for describing an other-ship tracking monitoring system according to an embodiment of the present disclosure.

A system according to an embodiment of the present disclosure for solving the above technical problem includes: a sensor information collection unit configured to generate a wide-angle image of a sea area around an own ship; a tracking camera unit configured to track another ship included in the wide-angle image and collect an enlarged image; and a control unit configured to control the tracking camera unit by considering a position of the other ship included in the wide-angle image.

In the system, the sensor information collection unit may further include: a wide-angle image collection module configured to generate the wide-angle image by combining images obtained by using a plurality of cameras; a radar information collection module configured to collect radar information about the sea are around the own ship; an other-ship information collection module configured to collect other-ship information including at least one of a size, a position, a speed, and an orientation of the other ship; and an own-ship information collection module configured to collect own-ship information including at least one of an attitude, a position, a speed, and an orientation of the own ship.

In the system, the control unit may be configured to control the tracking camera unit based on the own-ship information and the other-ship information, correct a coordinate state value of the tracking camera unit based on attitude information about the own ship, and control the tracking camera unit based on the corrected coordinate state value of the tracking camera unit, the position information about the other ship, and relative position information about the own ship and the other ship.

The system may further include a selection information collection unit configured to receive selection information about a selected other ship from among a plurality of other ships included in the wide-angle image.

In the system, the control unit may calculate, based on the other ship not being located in a preset center area in the enlarged image, an offset between a center of the enlarged image and a center of a bounding box of the other ship, and control the tracking camera unit based on the offset such that the other ship is located in the preset center area of the enlarged image.

In the system, the tracking camera unit may be configured to perform a continuous scan operation on the sea area around the own ship, and based on another ship being detected during the continuous scan operation, extract position coordinates of the other ship by considering a tracking camera control value at a time when the other ship is detected, own-ship information, and an offset where a center of the other ship is located in the enlarged image, and the control unit may be configured to update a list of previously detected ships based on the extracted position coordinates of the other ship detected by the tracking camera unit.

The system may further include a display unit configured to simultaneously provide the wide-angle image and an enlarged image of a selected other ship.

When a plurality of other ships are included in the wide-angle image, the other-ship tracking monitoring system may automatically select one ship from among the plurality of other ships based on predetermined criteria as the ship that the tracking camera is to track and collect an enlarged image for.

A method according to another embodiment of the present disclosure for solving the above technical problem includes: a sensor information collection operation of generating a wide-angle image of a sea area around a ship; a selection information collection operation of receiving selection information about another ship that is selected based on the wide-angle image; a tracking camera control value generation operation of generating a control value for controlling a tracking camera by considering a position of the selected other ship appearing in the wide-angle image; and an enlarged-image collection operation of collecting an enlarged image of the selected other ship from the tracking camera based on the control value.

In the method, the tracking camera control value generation operation may include: correcting a coordinate state value of the tracking camera unit based on attitude information about an own ship; and generating a control value based on the corrected coordinate state value of the tracking camera unit, position information about the other ship, and relative position information about the own ship and the other ship.

In the method, the tracking camera control value generation operation may include: based on the other ship not being located in a preset center area in the enlarged image, calculating an offset between a center of the enlarged image and a center of a bounding box of the other ship; and generating a control value based on the offset such that the other ship is located in the preset center area of the enlarged image.

Hereinafter, preferred embodiments will be described in detail with reference to the accompanying drawings for those of skill in the art to be able to implement the present disclosure without any difficulty. In describing preferred embodiments of the present disclosure in detail, when the detailed description of the relevant known functions or configurations is determined to unnecessarily obscure the gist of the present disclosure, the detailed description will be omitted. In addition, the same reference numerals are used throughout the drawings for elements having similar functions and actions.

In addition, throughout the present specification, when a part is referred to as being 'connected to' another part, it may be 'directly connected to' the other part or may be 'indirectly connected to' the other part through an intervening element. When an element is referred to as 'including' a component, the element may additionally include other components rather than excluding other components as long as there is no particular opposing recitation.

The present disclosure may be embodied in many different forms and should not be construed as being limited to embodiments set forth herein.

FIG. 1 is a diagram for describing an other-ship tracking monitoring system according to an embodiment of the present disclosure.

Referring to FIG. 1, an other-ship tracking monitoring system 10 according to an embodiment of the present disclosure may include a sensor information collection unit 100, a display unit 200, a selection information collection unit 300, a tracking camera unit 400, and a control unit 500. The other-ship tracking monitoring system 10 may include a processor and a memory.

The memory is hardware in which various data processed in the other-ship tracking monitoring system 10 is stored. Th memory may also store programs for processing and controlling the processor.

For example, the memory may store various data, such as a video, an image, and data of an object obtained using the sensor information collection unit 100 and the tracking camera unit 400, and data generated according to the operation of the processor. The memory may also store an operating system (OS) and at least one program (e.g., a program necessary for the processor to operate).

The processor controls the overall operation of the other-ship tracking monitoring system 10. For example, the processor may have overall control over the sensor information collection unit 100, the display unit 200, a selection information collection unit 300, a tracking camera unit 400, and a control unit 500, the memory, and the like by executing programs stored in the memory.

The processor may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

The memory may include, for example, random access memory (RAM), such as dynamic random access memory (DRAM) and static random access memory (SRAM), read-only memory (ROM), electrically erasable programmable read-only memory (EEPROM), CD-ROM, Blu-ray or other optical disk storage, a hard disk drive (HDD), a solid state drive (SSD), or flash memory.

The sensor information collection unit 100 may obtain at least one piece of sensor information. The sensor information collection unit 100 may process and/or combine the at least one piece of sensor information and transmit resulting data to the display unit 200 and the control unit 500. In addition, the sensor information collection unit 100 may include at least one of a wide-angle image collection module 110, a radar information collection module 120, an other-ship information collection module 130, and an own-ship information collection module 140.

The wide-angle image collection module 110 may collect wide-angle images of the surroundings of the ship by using at least one camera fixed to the ship. At least one camera may be mounted on the bow, stern, a central portion, etc. of the ship to obtain images of the surroundings of the ship. For example, a camera may be installed in the bow direction on the compass deck or the foremast of the ship. The installation position of the camera may be changed within a range that does not obstruct the front viewing angle.

According to an embodiment, the wide-angle image collection module 110 may include at least three cameras that capture images in a range of greater than 80 degrees and less than 120 degrees. Accordingly, the wide-angle image collection module 110 may generate a panoramic image in a range of greater than 180 degrees and less than 225 degrees. In another embodiment, the wide-angle image collection module 110 may include at least one camera that captures an image in a range of greater than 45 degrees and less than 270 degrees, but the present disclosure is not limited thereto.

The wide-angle image collection module 110 may generate a wide-angle image by combining images obtained by a plurality of cameras. For example, the wide-angle image collection module 110 may generate a panoramic image or a panoramic video by combining images obtained by a plurality of cameras.

The wide-angle image collection module 110 may preprocess the combined wide-angle image to correct a distorted image with respect to a fixed coordinate axis. Accordingly, the wide-angle image collection module 110 may generate a wide-angle image based on a fixed coordinate axis (e.g., the X-axis). For example, the wide-angle image collection module 110 may generate a corrected wide-angle image in which the horizontal line is parallel to a fixed coordinate axis (e.g., the X-axis).

For example, the wide-angle image collection module 110 may receive, from the own-ship information collection module 140 and/or the control unit 500, information obtained by analyzing a motion of an own ship, such as attitude or speed, and may perform preprocessing based on the received information to correct a combined wide-angle image without shaking. The information obtained by analyzing a motion of the own ship, such as attitude or speed, may include information about the roll, yaw, and pitch of the own ship.

The wide-angle image collection module 110 may detect an object in the corrected wide-angle image and estimate the position of the object with respect to the own ship. For example, the wide-angle image collection module 110 may detect another ship in the corrected wide-angle image, and convert and store world coordinate values of the other ship based on the detected other-ship information. According to an embodiment, the wide-angle image collection module 110 may generate a bounding box based on the detected other-ship information. A bounding box may be generated for each detected object and stored in the wide-angle image collection module 110.

The wide-angle image collection module 110, according to control of the processor, may detect an object using an object specifying model and specify the object by forming a bounding box containing the object. The processor 102 may perform at least one or more of object detection, object specification, and object type classification using the object specifying model. The object specifying model may be an artificial intelligence model. An artificial intelligence model will be described in more detail below.

The wide-angle image collection module 110 may store the corrected wide-angle image in the memory. The wide-angle image collection module 110 may also store the detected other-ship information and the converted world coordinate values of the other ship, along with the corrected wide-angle image in the memory. According to an embodiment, the wide-angle image collection module 110 may also store the bounding box of each other ship along with the corrected wide-angle image. The wide-angle image collection module 110 may transmit the generated wide-angle image to the display unit 200 and/or the control unit 500.

The radar information collection module 120 may collect radar signals for the ocean around the ship by using a radar. The radar information collection module 120 may collect radar signals within a range within a certain distance from the ship. The radar information collection module 120 may collect radar signals by using the radar, generate a radar image, and transmit the radar image to the display unit 200.

Here, the radar information collection module 120 may include a radar sensor. The radar sensor is a sensor configured to detect an object and obtain information about the detected object by irradiating the object with electromagnetic waves and measuring electromagnetic waves reflected after striking the object, and may obtain the information about the object in the form of point data.

The other-ship information collection module 130 may collect other-ship information including at least one of a position, a speed, and an orientation of another ship within a certain distance from the own ship. The other-ship information may further include identification information of another ship within a certain distance from the own ship, information about the type, length, width, etc. of the ship, static information about the position of an antenna, etc., dynamic information that changes according to the navigation status of the ship, such as heading, navigation status, rate of turn, or inclination angle, navigation information about a route plan, a destination, and an estimated time of arrival, etc. The other-ship information collection module 130 may include an automatic identification system (AIS). The AIS is a navigation device capable of transmitting information about the own ship to other ships within a radio wave range and receiving information from the other ships and information from a land-based control system, by using wireless communication.

The own-ship information collection module 140 may collect own-ship information including at least one of an attitude, a position, a speed, and an orientation of the own ship by using at least one sensor provided in the own ship. The own-ship information collection module 140 may include at least some of an inertial measurement unit (IMU), an AIS, a global positioning system (GPS), a speed log, and a gyro sensor. The IMU is a device for collecting information associated with the speed, attitude change, etc. of the own ship, may include at least one of an angular velocity sensor, an acceleration sensor, and a geomagnetic sensor, and may measure a tilt angle of the own ship by measuring inertia. The AIS may be a system for collecting information about the own ship, such as a position, a speed, or an orientation. The own-ship information collection module 140 may be omitted according to an embodiment.

At least one of the wide-angle image, the radar signal, the own-ship information, and the other-ship information collected by the sensor information collection unit 100 may be transmitted to the control unit 500. At least one of the wide-angle image, the radar signal, the own-ship information, and the other-ship information collected by the sensor information collection unit 100 may be used to track another ship and generate a tracking camera control value. For example, the control unit 500 may calculate relative speeds and orientations between the own ship and the other ship by using at least one of the collected wide-angle image, radar signal, own-ship information, and other-ship information, and may generate a control value for tracking the other ship.

The sensor information collection unit 100 may transmit at least one piece of sensor information to the display unit 200. At least one of the wide-angle image, the radar signal, the own-ship information, and the other-ship information collected by the sensor information collection unit 100 may be transmitted to the display unit 200. Accordingly, a user may check at least one piece of sensor information obtained by the sensor information collection unit 100.

The display unit 200 may receive at least one of the wide-angle image, the radar signal, the own-ship information, and the other-ship information, from the sensor information collection unit 100. The display unit 200 may display at least one of the wide-angle image, the radar signal, the own-ship information, and the other-ship information that are received from the sensor information collection unit 100. A wide-angle image, a radar signal, and an enlarged image may be displayed on the same display device, or may be displayed on different display devices. In a case in which they are displayed on different devices, the display unit 200 may include a wide-angle display module and a tracking display module.

The display unit 200 may display a wide-angle image or a radar signal collected by the image information collection unit 100 or an enlarged image collected by the tracking camera unit 400. The display unit 200 will be described in more detail with reference to FIG. 5.

The selection information collection unit 300 may receive selection information. The selection information may be input by the user. The selection information may include information about at least one other ship selected by the user. The information about at least one other ship may be selected by the user based on information provided from the sensor information collection unit 100. The selection information may include information about at least one other ship selected as an observation target from among a plurality of other ships.

For example, the user may check wide-angle image information displayed via the display unit 200 which displays a plurality of other ships, select at least one other ship to be more observed from among the plurality of other ships included in the wide-angle image information, and input information about the selected other ship through the selection information collection unit 300. Accordingly, the selection information collection unit 300 may receive the selection information.

The selection information collection unit 300 may include various input means such as a touch-enabled display, a keyboard, or a mouse. According to an embodiment, the selection information collection unit 300 may be a part of the display unit 200. For example, if the display unit 200 is a touch screen device, the selection information collection unit 300 may be a touch input interface of the display unit 200. The selection information collection unit 300 may transmit the collected selection information to the control unit 500.

The control unit 500 may receive, from the sensor information collection unit 100, information collected by the sensor information collection unit 100. The control unit 500 may generate a tracking camera control value based on at least one of a wide-angle image, a radar signal, own-ship information, and other-ship information that are received from the sensor information collection unit 100. The control unit 500 may generate a tracking camera control value to allow an enlarged-image collection module 410 to continuously scan a wide-angle image.

The control unit 500 may automatically generate a tracking camera control value such that the enlarged-image collection module 410 automatically collects an enlarged image in response to detecting another ship while continuously scanning the wide-angle image without receiving a human intervention or receiving the selection information.

Also, the control unit 500 may receive the selection information from the selection information collection unit 300, and may generate a tracking camera control value by considering the selection information additionally. The control unit 500 may track the other ship selected based on the selection information, and generate a control value for the tracking camera unit.

The control unit 500 refers to a unit of processing at least one function or operation, and may be implemented as software, hardware, or a combination of software and hardware, controlled by the processor. It may be implemented as an application specific integrated circuit (ASIC), digital signal processor (DSP), digital signal processing device (DSPD), programmable logic device (PLD), field programmable gate array (FPGA), controller, microcontroller, microprocessor, and other electrical unit for performing functions. Or, the control unit 500 may be implemented as software module in the program executed by the processor.

The control unit 500 may include an other-ship tracking module 510, a tracking camera control value generation module 520 and a collision risk detection module 530.

The other-ship tracking module 510, the tracking camera control value generation module 520, and a collision risk detection module 530 may be provided by logically dividing the functions of the control unit 500, and may be implemented integrally in a single computing device or in a single program or in a combination thereof, or individually in separate units according to the respective logical functions. For example, they may be implemented separately in different ones of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions, or they may be implemented integrally in a single one of them.

The other-ship tracking module 510 may track another ship by using at least one of a wide-angle image, a radar signal, own-ship information, and other-ship information that are received from the sensor information collection unit 100. The other-ship tracking module 510 may track another ship around the ship by fusing at least some of a wide-angle image, a radar signal, own-ship information, and other-ship information that are received from the sensor information collection unit 100, with each other. For example, the other-ship tracking module 510 may track another ship by mapping a ship-specific tag in radar information with a wide-angle image.

For example, the other-ship tracking module 510 may identify another ship in image information by using artificial intelligence, and track a movement of the other ship. The other-ship tracking module 510 may track another ship by using a trained artificial intelligence model. The artificial intelligence model may be trained based on supervised learning by using images including other ships as training data, and may recognize and track another ship through a camera image recognition algorithm.

An artificial intelligence model refers to a set of machine learning algorithms using a layered algorithm structure based on a deep neural network in machine learning technology and cognitive science. For example, the artificial intelligence model may include an input layer receiving an input signal or input data from an external source, an output layer outputting an output signal or output data in response to the input data, and at least one hidden layer positioned between the input layer and the output layer to receive a signal from the input layer, extract characteristics from the receive signal, and transmit the same to the output layer. The output layer receives a signal or data from the hidden layer and outputs the same to the outside.

The object specifying model may be trained using at least one of logging data and data generated using a generative artificial intelligence model. Here, the logging data may refer to photographs of the object directly taken by image capturing device and used for the training of the artificial intelligence model. The generative artificial intelligence model may refer to an artificial intelligence model able to generate or apply text, documents, pictures, or images, unlike existing artificial intelligence models each configured to analyze and determine given data. Therefore, data generated using the generative artificial intelligence model may refer to data generated using the generative artificial intelligence model in order to train the object specifying model.

Accordingly, by using the generative artificial intelligence model, the processor may obtain object photographs that are typically difficult to acquire or not usually available as logging data and train the object specifying model using the same.

Data for the training of the object specifying model may be data containing various objects without any limitation in type. For example, data for the training of the object specifying model may include, but is not limited to, various objects such as small ships, large ships, boats, yachts, jet skis, buoys, people, reefs, icebergs, and people.

According to an embodiment, the other-ship tracking module 510 may track at least one other ship detected in a wide-angle image received from the sensor information collection unit 100. Here, the other-ship tracking module 510 may further use at least one of a radar signal, own-ship information, and other-ship information that are received from the sensor information collection unit 100. The other-ship tracking module 510 may transmit information about the tracked other ship to the tracking camera control value generation module 520.

According to an embodiment, the other-ship tracking module 510 may receive selection information from the selection information collection unit 300. The selection information may be information about a selection of at least one of a plurality of other ships. The other-ship tracking module 510 may identify and track the selected other ship, and transmit information about the tracked other ship to the tracking camera control value generation module 520.

According to an embodiment, the other-ship tracking module 510 may receive, from the tracking camera unit 400, an enlarged image of the other ship and information including the position and size of the other ship. The other-ship tracking module 510 may improve the other-ship tracking performance by using the enlarged image of the other ship and the information about the position and size of the other ship.

The tracking camera control value generation module 520 may generate a tracking camera control value based on the information about the detected other ship received from the sensor information collection unit 100, the selection information received from the selection information collection unit 300, and/or the information about the tracked other ship received from the other-ship tracking module 510.

The tracking camera control value may be a value for controlling the tracking camera unit 400 to collect enlarged image information. The enlarged image information may include image information obtained by capturing an enlarged image of a detected, selected, or tracked other ship. The tracking camera control value generation module 520 may generate a tracking camera control value for controlling the tracking camera unit 400, considering at least one of a size, a position, and coordinates of a center point of another ship appearing in the image information.

The tracking camera control value may include information indicating at least one of a horizontal rotation angle, a vertical rotation angle, and a magnification ratio of the enlarged-image collection module 410 included in the tracking camera unit 400. The tracking camera control value generation module 520 may use own-ship information and/or other-ship information received from the sensor information collection unit 100 to calculate a tracking camera control value. For example, the tracking camera control value generation module 520 may calculate at least one of relative speeds, positions, and orientations between the own ship and another ship by considering own-ship information including at least one of a speed, an attitude, a position, and a heading of the own ship, and other-ship information including at least one of a speed, a position, and a heading of the other ship, and may determine a tracking camera control value according to a result of the calculation.

According to an embodiment, the tracking camera control value generation module 520 may control the enlarged-image collection module 410 to automatically perform a continuous scan operation even when there is no other ship selected by the user as an observation target, and to automatically transmit, in response to detecting another ship during the continuous scan operation, information about and/or an enlarged image of the detected other ship to the other-ship tracking module 510. Accordingly, the other-ship tracking module 510 and the tracking camera control value generation module 520 may obtain information about another ship that has been missed in a wide-angle image, and may improve the object tracking performance by using object information detected by the tracking camera unit 400. For example, the other-ship tracking module 510 may generate bounding boxes not only for the ships detected in the wide-angle image, but also for the ships that are not initially detected in the wide-angel image but detected and added based on object information detected by the tracking camera unit 400.

According to an embodiment, the tracking camera control value generation module 520 may generate a control value for controlling the enlarged-image collection module 410 to photograph a plurality of designated regions of interest at regular time intervals, in order to collect information about other ships that may be missed in a wide-angle image. Accordingly, the enlarged-image collection module 410 may automatically and intensively track and capture enlarged images of the plurality of designated regions of interest.

After tracking starts, the tracking camera control value generation module 520 may receive enlarged images collected by the tracking camera unit 400, and perform feedback on whether the tracking camera unit 400 is properly tracking the selected other ship. When an image of the selected other ship is not properly visible in an enlarged image, or when the selected other ship is not observed in an enlarged image, feedback may be performed to make fine adjustments to the horizontal rotation angle, the vertical rotation angle, and the magnification ratio of the tracking camera unit 400.

When the selected other ship is not located at a central portion of an enlarged image obtained through the tracking camera unit 400, the tracking camera control value generation module 520 may generate a feedback control value for locating the selected other ship at a central portion of the enlarged image through feedback control. Feedback control will be described in more detail below with reference to FIGS. 3 and 4.

A collision risk detection module 530 may generate a warning message relating to another ship that has a high risk of collision with the own ship, among other ships tracked by the other-ship tracking module 510. The collision risk detection module 530 may detect the risk of collision between the own ship and another ship and generate a warning message. The collision risk detection module 530 may transmit the warning message to the display unit 200, and the display unit 200 may display the warning message in a pop-up form. According to an embodiment, the other-ship tracking monitoring system 10 may include a sound system, and the sound system may generate an audible alarm signal based on the detection of the collision risk by the collision risk detection module 530.

The collision risk detection module 530 may generate a control signal to control at least one propulsion system of the own-ship on which the other-ship tracking monitoring system 10 is installed to maneuver in a way avoiding collision with the detected other ship that has a high risk of collision.

According to an embodiment, the collision risk detection module 530 may be omitted.

The tracking camera unit 400 may collect enlarged images of other ships based on a tracking camera control value received from the control unit 500. The tracking camera unit 400 may transmit the collected enlarged images to the control unit 500. The tracking camera unit 400 may include the enlarged-image collection module 410 and a tracking camera control module 420.

The tracking camera control module 420 may control the operation of the enlarged-image collection module 410. The tracking camera control module 420 may receive a tracking camera control value from the control unit 500, and may control the mechanical operation of the enlarged-image collection module 410 based on the tracking camera control value. The tracking camera control module 420 may be implemented as hardware, or software in a program executed by the processor, or a combination thereof. The processor may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

According to an embodiment, the tracking camera control module 420 may independently track another ship. In this case, the tracking camera control module 420 may independently control the enlarged-image collection module 410 to track another ship and collect enlarged images without an instruction from the control unit 500.

For example, the tracking camera control module 420 may control the enlarged-image collection module 410 to detect and track another ship while automatically performing continuous scanning or photographing a position of interest at regular time intervals even when there is no other ship selected as an observation target. The tracking camera control module 420 may calculate information about the size and/or position of a detected ship in an enlarged image based on an operation control value from the enlarged-image collection module 410, and may transmit information about a calculated position of a ship to the control unit 500 to transmit information about another ship that has been missed in a wide-angle image.

The tracking camera control module 420 may detect a ship while continuously scanning by enlarging a sea situation or photographing a designated position of interest at regular time intervals. The tracking camera control module 420 may detect a ship that has not been detected by the wide-angle image collection module 110, such as a small wooden boat, a ship without an AIS installed, or a ship with a low height. In response to detecting a ship, the tracking camera control module 420 may transmit, to the control unit 500, a tracking camera control value at the time of the detection of the ship.

Here, the control unit 500 may extract world coordinate values of the other ship detected by the tracking camera unit 400, by using the tracking camera control value received from the tracking camera control module 420, own-ship information, and a tracking camera calibration value. By using the extracted world coordinate values, the control unit 500 may confirm whether the other ship matches information about a previously detected ship, and when there is no matching information, may update new ship information to a list of ships to be tracked. Accordingly, the user may check the new ship information through the display unit 200 or select the new ship information through the selection information collection unit 300.

The other-ship tracking module 510 of the control unit 500 may improve the object tracking performance by additionally using object information detected by the tracking camera unit 400. To collect information about a target that may be missed in a wide-angle image, a tracking camera may intensively track and capture an enlarged image of the corresponding area.

In another embodiment, the tracking camera control module 420 may be omitted, and in this case, the above-described operations of the tracking camera control module 420 may be performed by the control unit 500. The enlarged-image collection module 410 may collect enlarged images of a selected other ship based on control by the tracking camera control module 420. The enlarged-image collection module 410 may include a camera having a pan-tilt-zoom (PTZ) function. The enlarged-image collection module 410 may include a camera having horizontal rotation (pan), vertical rotation (tilt), and zoom functions, and capable of tracking a selected object. The enlarged-image collection module 410 may transmit the collected enlarged images of the selected other ship to the control unit 500.

Figure 2:
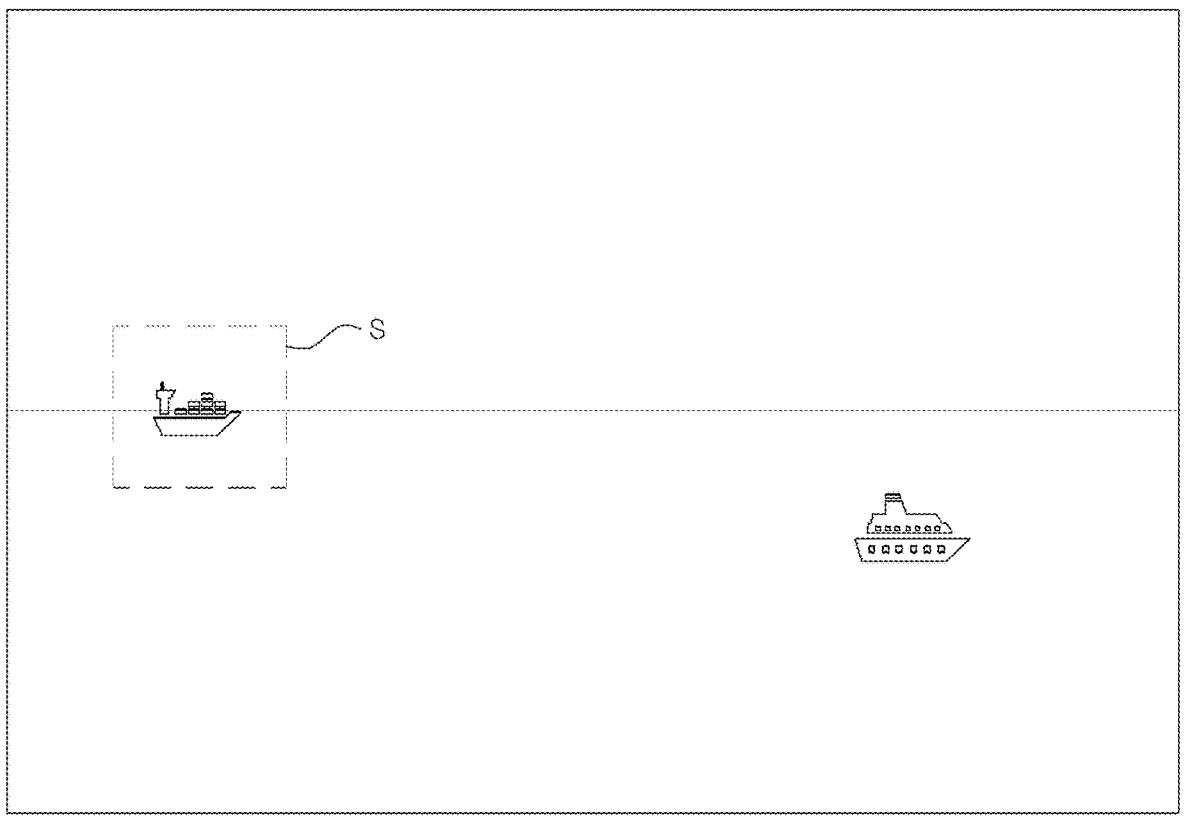
FIG. 2 illustrates a wide-angle image including other ships.
Figure 3:
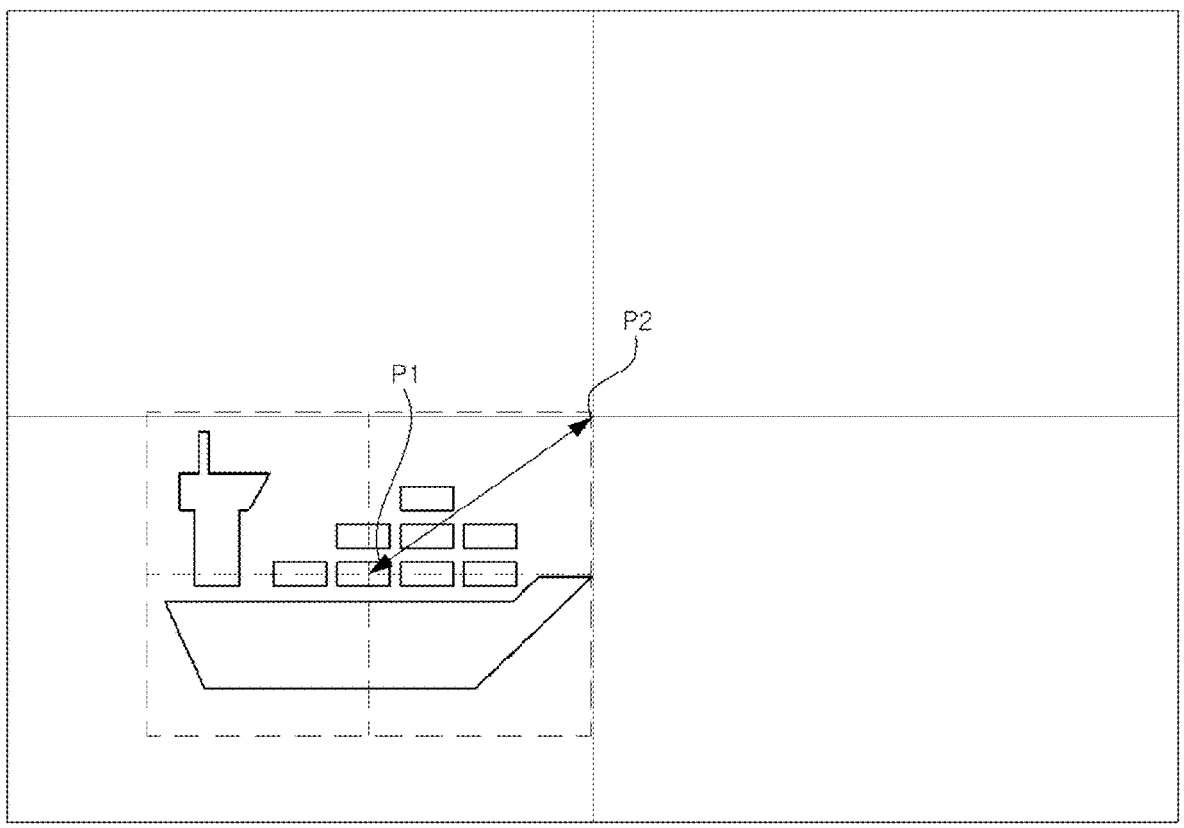
FIG. 3 illustrates an enlarged image of another ship selected in FIG. 2.
Figure 4:
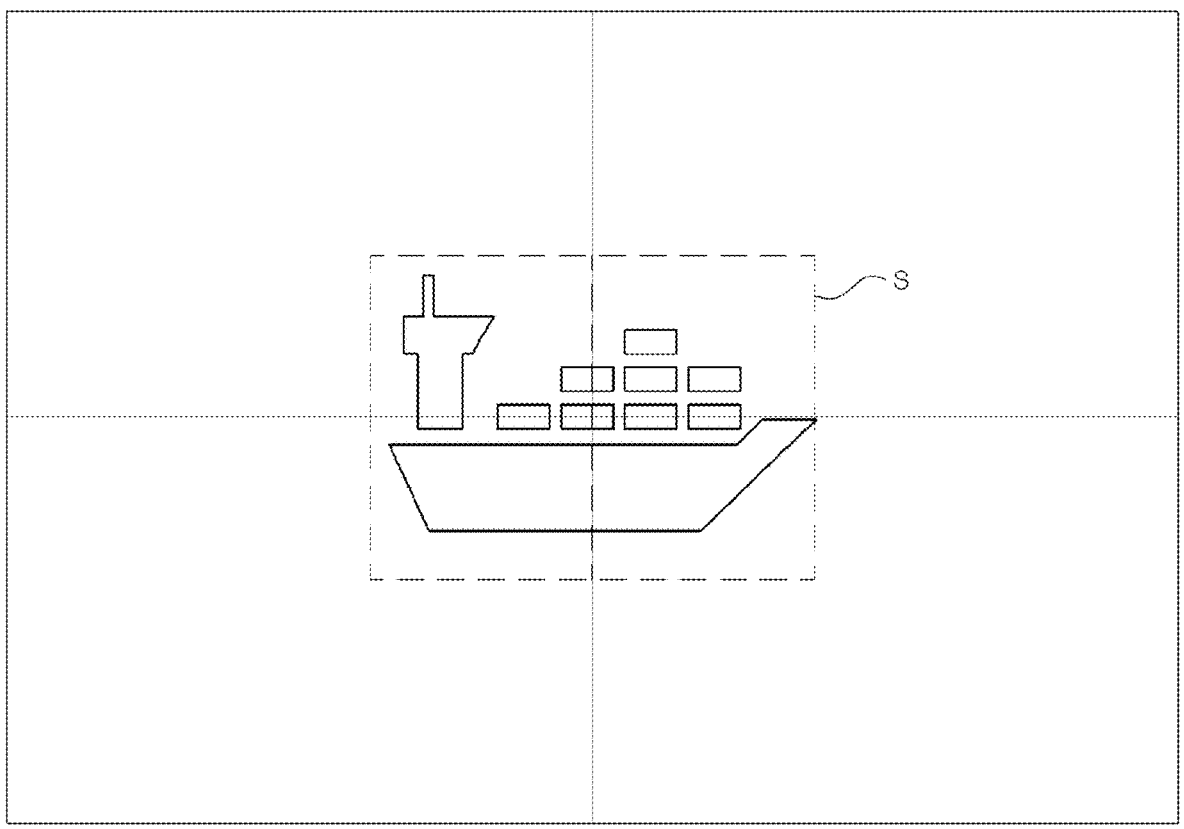
FIG. 4 illustrates an image in which a center offset is adjusted in the enlarged image of FIG. 3.

FIGS. 2 to 5 are diagrams for describing operations of the control unit. FIG. 2 illustrates a wide-angle image including other ships, FIG. 3 illustrates an enlarged image of another ship selected in FIG. 2, and FIG. 4 illustrates an image in which a center offset is adjusted in the enlarged image of FIG. 3. Hereinafter, description will be made with reference to FIG. 1.

Referring to FIG. 2, the control unit 500 may receive information about a detected other ship received from the sensor information collection unit 100, selection information received from the selection information collection unit 300, and information about a tracked other ship received from the other-ship tracking module 510.

The control unit 500 may receive selection information S. The selection information S may include information about another ship to be observed. For example, the selection information S may include information that is input through the selection information collection unit 300. Accordingly, the selection information S may include information about another ship selected by the user.

According to an embodiment, the selection information S may include information of a bounding box formed around the other ship to be observed. The bounding box may or may not be displayed to the user through the display unit 200. The bounding box will be described in more detail with reference to FIG. 6.

The operation of the control unit 500 of FIG. 2 may be performed by the other-ship tracking module 510 and the tracking camera control value generation module 520. For example, the other-ship tracking module 510 may receive the selection information S and transmit the selection information S and tracking information about the selected other ship to the tracking camera control value generation module 520, and the tracking camera control value generation module 520 may generate a tracking camera control value based on the received selection information S and tracking information about the selected other ship.

Referring to FIG. 3, the control unit 500 may receive an enlarged image of the other ship from the tracking camera unit 400. The other-ship tracking module 510 may receive, from the enlarged-image collection module 410, an enlarged image of the other ship that is determined to be an observation target according to the selection information S.

The tracking camera control value generation module 520 may receive enlarged images collected by the tracking camera unit 400, and perform feedback on whether the tracking camera unit 400 is properly tracking the selected other ship. When an image of the selected other ship is not properly visible in an enlarged image, or when the selected other ship is not observed in an enlarged image, feedback may be performed to make fine adjustments to the horizontal rotation angle, the vertical rotation angle, and the magnification ratio of the tracking camera unit 400.

When the selected other ship is not located at a central portion of an enlarged image obtained through the tracking camera unit 400, the tracking camera control value generation module 520 may generate a feedback control value for locating the selected other ship at a central portion of the enlarged image through feedback control.

For example, in an ideal case, the other ship to be observed may be located at the center of the enlarged image. However, a center P1 of the bounding box of the other ship to be observed may not be located at a center P2 of the enlarged image due to, for example, an error in a control value from the tracking camera control module 420 or the control unit 500.

The tracking camera control value generation module 520 may estimate an offset between the center P1 of the bounding box of the other ship and the center P2 of the enlarged image, and correct the control value for the tracking camera based on the estimated offset. The tracking camera control value generation module 520 may transmit the corrected tracking camera control value to the tracking camera control module 420. Referring to FIG. 4, it may be seen that the center offset is adjusted in the enlarged image of FIG. 3 such that the center P1 of the bounding box of the other ship to be observed and the center P2 of the enlarged image coincide with each other.

In another embodiment, the tracking camera control module 420 of the tracking camera unit 400 may also correct a control value for the tracking camera. In this case, the tracking camera control module 420 may estimate an offset between the center P1 of the bounding box of the other ship and the center P2 of the enlarged image, correct the control value for the tracking camera based on the estimated offset, and control the enlarged-image collection module 410 based on the corrected control value for the tracking camera.

Figure 5:
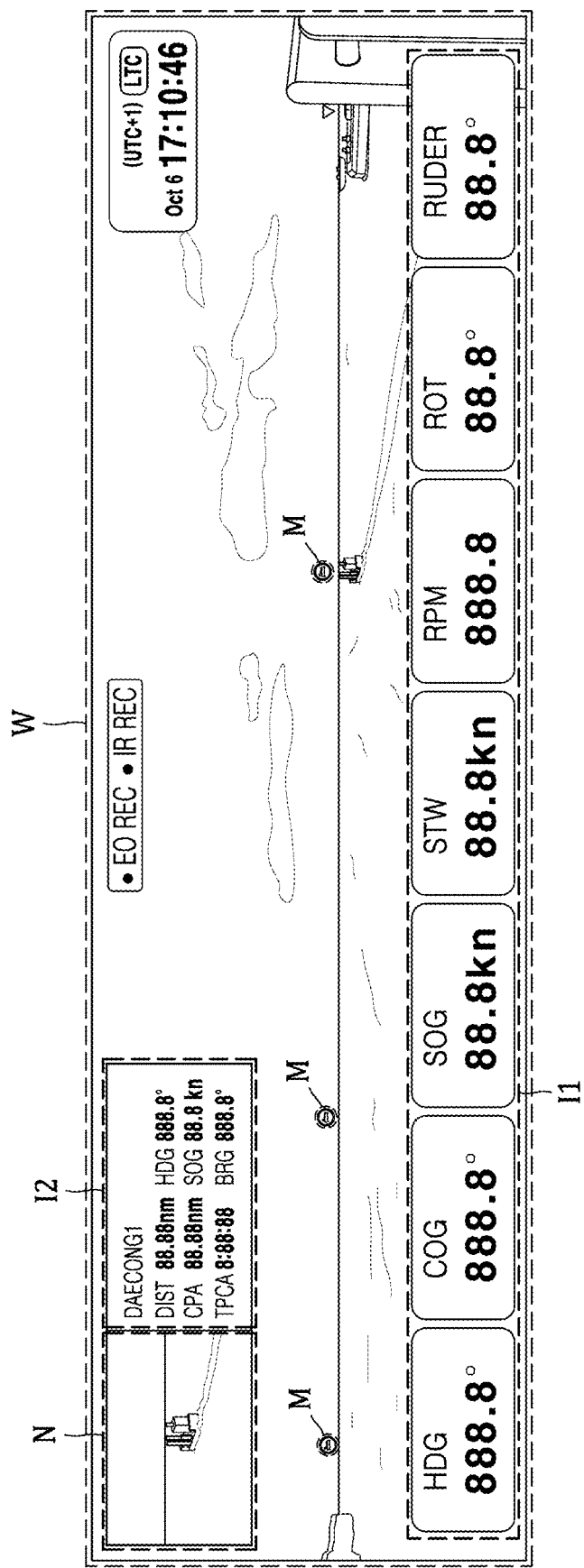
FIG. 5 illustrates an image displayed on a display unit, according to an embodiment of the present disclosure.

FIG. 5 illustrates an image displayed on a display unit, according to an embodiment of the present disclosure.

Referring to FIG. 5, the display unit 200 may display at least one of a wide-angle image W, an enlarged image N, a radar signal, own-ship information I1, and other-ship information I2 that are received from the sensor information collection unit 100.

According to an embodiment, the display unit 200 may further display the enlarged image N collected by the tracking camera unit 400. The display unit 200 may simultaneously display the wide-angle image W and the enlarged image N. The display unit 200 may display the wide-angle image W and the enlarged image N in a picture-in-picture (PIP) extension form, and in response to another ship being selected in the wide-angle image W, the enlarged image N of the selected other ship may be displayed in a pop-up form. However, the present disclosure is not limited thereto, and the wide-angle image W and the enlarged image N may be displayed on one display device in various manners.

Here, the display unit 200 may display other ships shown in the enlarged image N, as markers M in the wide-angle image W. Accordingly, the user may intuitively recognize where the enlarged other ship is located in the wide-angle image W.

The display unit 200 may display the own-ship information I1 along with the wide-angle image W. The own-ship information I1 may include information about at least one of a position, a speed, an orientation, and an attitude of the own ship. The own-ship information I1 may be information collected by the own-ship information collection module 140.

The display unit 200 may display the other-ship information I2 included in the enlarged image N, along with the enlarged image N. The other-ship information I2 may include information about at least one of a position, a speed, and an orientation of another ship. The other-ship information I2 may be information collected by the other-ship information collection module 130. The other-ship information I2 may further include identification information of another ship within a certain distance from the own ship, information about the type, length, width, etc. of the ship, static information about the position of an antenna, etc., dynamic information that changes according to the navigation status of the ship, such as heading, navigation status, rate of turn, or inclination angle, navigation information about a route plan, a destination, and an estimated time of arrival, etc.

As the display unit 200 simultaneously displays the wide-angle image W, the enlarged image N, the own-ship information I1, and the other-ship information I2 about another ship selected as an observation target, the user may immediately and intuitively check necessary information and solve the problem that it is difficult to find another ship at once when using binoculars and to track and observe according to movements of the other ship and the own ship.

In addition, when another ship is selected by a crew member, and even when another ship is newly detected or when information about a tracked other ship is changed, the display unit 200 may automatically provide an enlarged image of the other ship, such that a crew member who has a watch duty may easily identify an object on a sea area that is difficult to identify with the naked eye. That is, the display unit 200, according to the control of the control unit 500 and/or the processor, may automatically select one ship from among the plurality of ships based on certain criteria and automatically display an enlarged image and information of the automatically selected ship in the enlarged image N and in the section for the other-ship information I2. The criteria may include information whether a ship is newly detected, information on whether information about the tracked other ship is changed, information on distance between the detected other ships and the own-ship, and information on unusual maneuver of the detected other ships.

Accordingly, the fatigue and concentration of the crew may be improved, and a navigation accident may be prevented.

Figure 6:
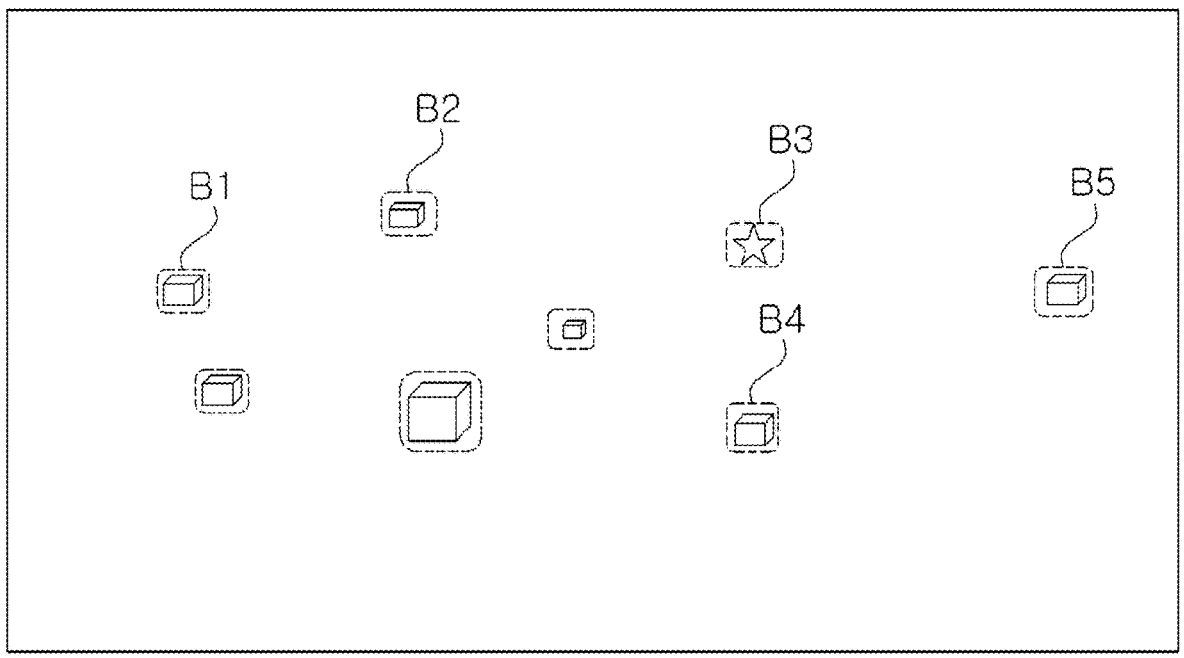
FIG. 6 is a diagram for describing an operation of a control unit according to an embodiment of the present disclosure.

FIG. 6 is a diagram for describing an operation of a control unit according to an embodiment of the present disclosure.

Referring to FIG. 6, a wide-angle image collected by the sensor information collection unit 100 and provided to the user by the display unit 200 may include one or more other ships. In FIG. 6, the one or more other ships may be shown as various shapes such as a hexagon or a star.

The other-ship tracking module 510 of the control unit 500 may generate bounding boxes B1 to B5 respectively for a plurality of detected other ships, and may track each of the plurality of other ships based on the bounding boxes B1 to B5. According to an embodiment, the wide-angle image collection module 110 may generate the bounding boxes B1 to B5 respectively for the plurality of detected other ships, and the other-ship tracking module 510 may track the other ships based on the generated bounding boxes B1 to B5.

The other-ship tracking module 510 may transmit information about the bounding boxes B1 to B5 to the tracking camera control generation module 520. According to an embodiment, the other-ship tracking module 510 may transmit, to the tracking camera control generation module 520, only information about the bounding box of the other ship selected as an observation target from among the bounding boxes B1 to B5. Selection of another ship as an observation target may be determined based on selection information (S of FIG. 2). The selection information (S of FIG. 2) may include selection information that is input through the selection information collection unit 300. The selection of the observation target from among the bounding boxes B1 to B5 may be automatically made by the controller 500. The tracking camera control generation module 520 may generate a tracking camera control value by using the position of the center point and the size of each of the bounding boxes B1 to B5 of the respective other ships.

For example, when the user selects one other ship (e.g., bounding box B3) from among the plurality of other ships shown in the image information through the selection information collection unit 300, the other-ship tracking module 510 may transmit, to the tracking camera control generation module 520, information about the bounding box B3 corresponding to the selected other ship among the plurality of bounding boxes B1 to B5. The tracking camera control value generation module 520 may generate a tracking camera control value by considering the position of the center point and the size of the bounding box B3 of the selected other ship. The tracking camera unit 400 may obtain an enlarged image based on the tracking camera control value.

Thereafter, when the position of the center point of the bounding box and the position of the center point of the enlarged image obtained by the tracking camera do not match, the tracking camera control value generation module 520 may perform feedback control to match the center lines.

Figure 7:
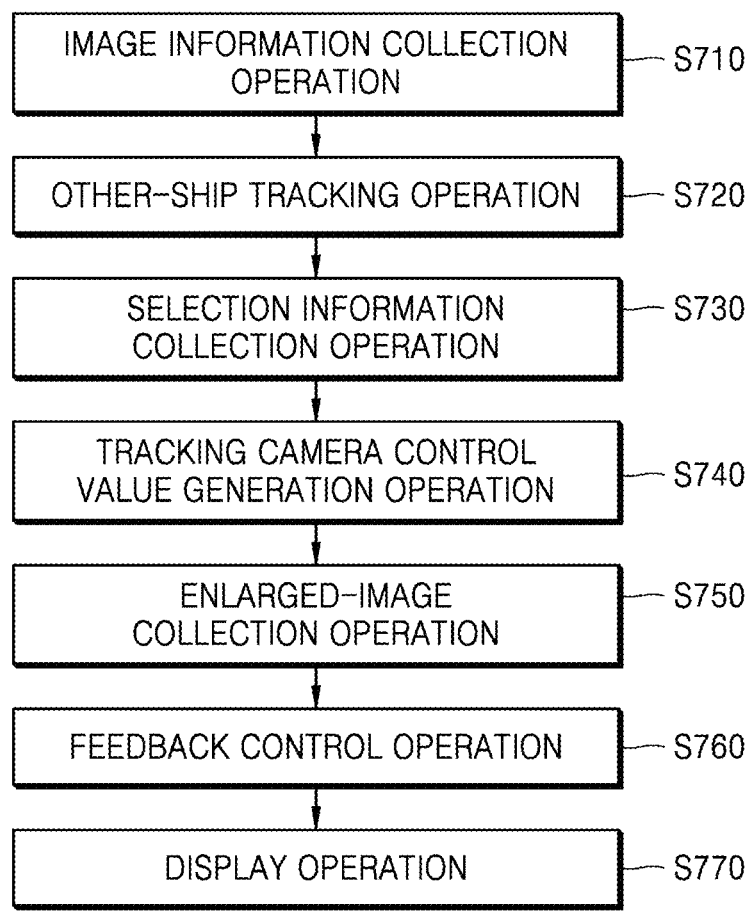
FIG. 7 is a flowchart for describing an other-ship tracking monitoring method according to an embodiment of the present disclosure.

FIG. 7 is a flowchart for describing an other-ship tracking monitoring method according to an embodiment of the present disclosure. The above description of the other-ship tracking monitoring system may be applied to the other-ship tracking monitoring method, and redundant descriptions will be omitted.

Referring to FIG. 7, in an image information collection operation S710, image information about a sea area around a ship may be collected. The image information may include a wide-angle image or a radar signal. The image information may be collected by a wide-angle camera or a radar.

In an other-ship tracking operation S720, another ship included in the image information may be tracked based on artificial intelligence or deep learning. The other-ship tracking module 510 may track the other ship by using a trained artificial intelligence model. The artificial intelligence model may be trained based on supervised learning by using marine images including other ships as training data, and may recognize and track another ship through a camera image recognition algorithm. The other-ship tracking module 510 may obtain relative position values of the other ship and the own ship by tracking objects around the own ship, such as other ships or buoys.

In a selection information collection operation S730, selection information about another ship that is selected based on the image information may be received. The user may select any one of a plurality of other ships shown in the image information. The selection information may be information including a position and a size of the selected other ship in the image information. The selection information collection operation S730 may include collecting information that is obtained when new other-ship information is detected or when information about a tracked other ship is changed, based on other-ship information that is detected in the wide-angle image and received from the wide-angle image collection module 110 or information about a tracked other ship that is received from the other-ship tracking module 510.

In a tracking camera control value generation operation S740, the tracking camera control value generation module 620 may control the tracking camera by considering the size and position of the selected other ship shown in the image information.

In the tracking camera control value generation operation S740, the tracking camera may be controlled considering not only the selection information about the position and size of the selected other ship in the image information but also own-ship information including at least one of an attitude, a position, a speed, and an orientation of the own ship, and/or other-ship information including at least one of a position, a speed, and an orientation of the selected other ship.

In an embodiment, the tracking camera control value generation module 620 may generate a tracking camera control value based on the relative position of the other ship tracked by the other-ship tracking module 510.

In an embodiment, the tracking camera control value generation module 620 may generate a tracking camera control value based on estimated values for the speed, attitude, and the like of the own ship, which are obtained by an IMU sensor of the own-ship information collection module, and the relative positions of the other ship tracked by the other-ship tracking module 510. In an enlarged-image collection operation S750, enlarged images of the selected other ship may be collected from the tracking camera. The tracking camera may collect the enlarged images while tracking the selected other ship.

In a feedback control operation S760, the tracking camera may be finely adjusted such that the selected other ship appears at the center of an enlarged image by using the enlarged images obtained from the tracking camera. Because a motion and a movement of the own ship may appear exaggeratedly in an enlarged image, an offset between the center of the enlarged image and the center of the target may be estimated and the roll, pitch, and yaw control values of the tracking camera may be precisely controlled such that the selected other ship is located at the center of enlarged images.

In a display operation S770, the display unit 200 may simultaneously provide an enlarged image of the other ship selected by clicking or double-clicking in the wide-angle image, together with the wide-angle image.

In describing the present disclosure, ' . . . unit' may be implemented by various manner, for example, by a processor, program instructions executable by a processor, a software module, microcode, a computer program product, a logic circuit, an application-specific integrated circuit, or firmware.

The methods disclosed in embodiments of the present disclosure may be directly implemented by a hardware processor, or may be implemented and performed by a combination of hardware and software modules in a processor. The software module may be stored in a related-art storage medium such as random-access memory, flash memory, read-only memory, programmable read-only memory, or electrically erasable programmable memory, or a register. The storage medium is located in a memory, and the processor reads information stored in the memory and combines it with the hardware to complete the above-described methods. In order to avoid duplication, detailed description will be omitted here.

The present disclosure is not limited by the above-described embodiments and the accompanying drawings. It is intended to limit the scope of the present disclosure by the appended claims, and it will be apparent to those of skill in the art that various substitutions, modifications, and changes may be made without departing from the technical spirit of the present disclosure described in the claims.

The invention claimed is:

1. An other-ship tracking monitoring system comprising:
a sensor information collection unit configured to generate a wide-angle image of a sea area around an own ship;
a tracking camera unit configured to track another ship included in the wide-angle image and collect an enlarged image; and
a control unit configured to control the tracking camera unit by considering a position of the other ship included in the wide-angle image,
wherein the control unit is configured to calculate, based on the other ship not being located in a preset center area in the enlarged image, an offset between a center of the enlarged image and a center of a bounding box of the other ship, and control the tracking camera unit based on the offset such that the other ship is located in the preset center area of the enlarged image.

2. The other-ship tracking monitoring system of claim 1, wherein the sensor information collection unit comprises:
a wide-angle image collection module configured to generate the wide-angle image by combining images obtained by using a plurality of cameras;
a radar information collection module configured to collect radar information about the sea area around the own ship;
an other-ship information collection module configured to collect other-ship information comprising at least one of a size, a position, a speed, and an orientation of the other ship; and
an own-ship information collection module configured to collect own-ship information comprising at least one of an attitude, a position, a speed, and an orientation of the own ship.

3. The other-ship tracking monitoring system of claim 2, wherein the control unit is configured to control the tracking camera unit based on the own-ship information and the other-ship information, correct a coordinate state value of the tracking camera unit based on attitude information about the own ship, and control the tracking camera unit based on the corrected coordinate state value of the tracking camera unit, the position information about the other ship, and relative position information about the own ship and the other ship.

4. The other-ship tracking monitoring system of claim 1, further comprising a selection information collection unit configured to receive selection information about a selected other ship from among a plurality of other ships included in the wide-angle image.

5. The other-ship tracking monitoring system of claim 1, wherein the tracking camera unit is configured to perform a continuous scan operation on the sea area around the own ship, and based on another ship being detected during the continuous scan operation, extract position coordinates of the other ship by considering a tracking camera control value at a time when the other ship is detected, own-ship information, and an offset where a center of the other ship is located in the enlarged image, and the control unit is configured to update a list of previously detected ships based on the extracted position coordinates of the other ship detected by the tracking camera unit.

6. The other-ship tracking monitoring system of claim 1, further comprising a display unit configured to simultaneously provide the wide-angle image and an enlarged image of a selected other ship.

7. The other-ship tracking monitoring system of claim 1, when a plurality of other ships are included in the wide-angle image, the other-ship tracking monitoring system is configured to automatically select one ship from among the plurality of other ships based on predetermined criteria as the ship that the tracking camera is to track and collect an enlarged image for.

8. An other-ship tracking monitoring method comprising:
a sensor information collection operation of generating a wide-angle image of a sea area around a ship;
a selection information collection operation of receiving selection information about another ship that is selected based on the wide-angle image;
a tracking camera control value generation operation of generating a control value for controlling a tracking camera by considering a position of the selected other ship appearing in the wide-angle image; and
an enlarged-image collection operation of collecting an enlarged image of the selected other ship from the tracking camera based on the control value,
wherein the tracking camera control value generation operation comprises:
based on the other ship not being located in a preset center area in the enlarged image, calculating an offset between a center of the enlarged image and a center of a bounding box of the other ship; and
generating a control value based on the offset such that the other ship is located in the preset center area of the enlarged image.

9. The other-ship tracking monitoring method of claim 8, wherein the tracking camera control value generation operation comprises:
correcting a coordinate state value of the tracking camera unit based on attitude information about an own ship; and
generating a control value based on the corrected coordinate state value of the tracking camera unit, position information about the other ship, and relative position information about the own ship and the other ship.

* * * * *